United States Patent Office 3,536,672
Patented Oct. 27, 1970

3,536,672
PROCESS FOR THE POLYMERIZATION OF α-AMINO ACID - N - CARBOXY ANHYDRIDES USING IMIDAZOLE INITIATORS
Yasuo Fujimoto and Keizo Tatsukawa, Machida-shi, Japan, assignors to Kyowa Hakko Kogyo Co., Ltd., Tokyo, Japan, a corporation of Japan
No Drawing. Continuation-in-part of application Ser. No. 745,679, July 18, 1968. This application Oct. 4, 1968, Ser. No. 764,987
Int. Cl. C08c 20/08
U.S. Cl. 260—78                          8 Claims

ABSTRACT OF THE DISCLOSURE

A process for the polymerization of α-amino acid-N-carboxy anhydrides wherein imidazole or a derivative thereof is used as the polymerization initiator. The resultant polyamino acids may be used for making films, fibers or synthetic leathers.

CROSS-REFERENCE TO THE RELATED APPLICATION

This application is a continuation-in-part of U.S. Ser. No. 745,679 filed on July 18, 1968 and now abandoned.

This invention relates to a process for the polymerization of α-amino acid-N-carboxy anhydrides. More particularly, it relates to a process for polymerizing N-carboxy anhydrides of α-amino acids having the general formula

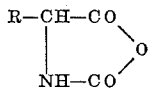

wherein R is an organic residue. Even more particularly, the invention relates to the polymerization of said N-carboxy anhydrides using imidazole derivatives. Hereinafter, for the sake of convenience, α-amino acid-N-carboxy anhydrides will be referred to as NCA.

It is generally known in the art that NCA compounds polymerize upon the release of carbon dioxide by means of amines, sodium alcoholates or the like, as indicated by the following reaction scheme:

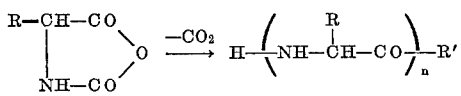

wherein R has the same meaning as indicated above and and R' is a hydroxy or alkoxy radical or an amine residue. However, the use of even more efficient initiators for this reaction would be highly desirable.

Accordingly, one of the objects of the present invention is to provide an improved process for polymerizing α-amino acid-N-carboxy anhydrides which overcomes the disadvantages and deficiencies of the prior art methods.

Another object of the present invention is to provide a process for the polymerization of α-amino acid-N-carboxy anhydrides which may be carried out in an efficacious manner.

A further object of the invention is to provide a novel polymerization initiator for α-amino acid-N-carboxy anhydrides and derivatives thereof.

A still further object of the invention is to provide the polymerization products resulting from the polymerization of α-amino acid-N-carboxy anhydrides.

These and other objects and advantages of the present invention will become apparent to those skilled in the art from a consideration of the following specification and claims.

As the result of various studies and experiments on the polymerization of NCA, the present inventors have found that imidazole compounds, which have not been used as a polymerization initiator heretofore, bring about a remarkable effect when used as a polymerization initiator for α-amino acid-N-carboxy anhydrides.

The imidazole compounds used in the present invention exhibit a polymerization-initiating ability which is equal to or even superior to that of the conventionally used organic bases or sodium alcoholates. Furthermore, a majority of these compounds exist in the form of crystals, so that they can be handled and stored easily, as compared with the organic bases which tend to contain water which substantially reduces the polymerization-initiating ability, and with sodium alcoholate which is readily decomposed in the presence of water.

In the present invention, the α-amino acid-N-carboxy anhydrides used are any of α-amino acid-NCA which can be synthesized from the corresponding α-amino acids, i.e., neutral amino acids, acidic amino acid monoesters and N-substituted derivatives of basic amino acids and derivatives thereof. Examples thereof include, for instance, glycine, alanine, α-aminobutyric acid, valine, norvaline, leucine, isoleucine, norleucine, phenylalanine, O-substituted serine, O-substituted homoserine, O-substituted threonine, O-substituted cysteine, cystine, methionine, aspartic acid-α-monoester, glutamic acid-γ-monoester, α-aminoadipic acid-δ-monoester, $N^{im}$-substituted histidine, proline, $N_\delta$-substituted ornithine, $N^\epsilon$-substituted lysine and $N^{guanido}$-substituted arginine. These amino acids and amino acid derivatives may be either optically active or inactive.

The polyamino acids obtained by polymerizing N-carboxy anhydrides of amino acids or amino acid derivatives such as those enumerated hereinabove, using the polymerization initiators of the present invention, find various applications as fibers, films, synthetic leathers and as additives for foodstuffs. The resultant polyamino acids have a particularly high degree of polymerization and are therefore excellent not only in their ability to form films, but also in their fiber-forming properties. This is why the polyamino acids can be readily used in a wide range of applications including the production of synthetic fibers and artificial leathers.

Exemplary imidazole compounds which may be used as polymerization initiators in accordance with the present invention include the following:

(1) Imidazole.
(2) Imidazole derivatives.
(a) Imidazole homologues—Imidazole, 1-phenylimidazole, 1-methylimidazole, 1-benzylimidazole, 2-methylimidazole, 2-phenylimidazole, 4-methylimidazole, 4-phenylimidazole, 1,2 - dimethylimidazole, 1,4 - dimethylimidazole, 1,5-dimethylimidazole, 1-ethyl-2-methylimidazole, 4,5-diphenylimidazole, 2,4,5-trimethylimidazole, etc.
(b) Halogen alkyl halide and hydroxyalkyl derivatives—2-bromoimidazole, 2-bromo-4-methylimidazole, 5-chloro- 1-methylimidazole, 4-chloromethylimidazole, 5-chloromethyl - 1-methylimidazole, 5-hydroxymethylimidazole, 5-hydroxymethylimidazole, 5-hydroxymethyl - 1-methylimidazole, etc.
(c) Nitro, amino, and aminoalkyl derivatives—4(5)-nitromidazole, 5(4)-methyl - 4(5) - aminoimidazole, 2-aminoimidazole, 4(5)-aminoimidazole, 4(5)-methyl-5(4) nitromidazole, etc.
(d) Aldehyde and ketone derivatives—4(5) - methylimidazole-5(4)-aldehyde, 4(5)-imidazole aldehyde, 2-imidazole-phenylketone, etc.
(e) Imidazolecarboxylic acids—4,5-imidazoledicarboxylic acid, 2-imidazolecarboxylic acid, 4-imidazolecarboxylic acid, 2-methyl-4(5)-imidazolecarboxylic acid, 4(5)- amino-5(4)-imidazolecarboxamide, 4(5)-amino-5(4)-imidazolecarboxylic acid methyl ester, 2-amino-4,5-imidazoledicarboxylic acid, 4-imidazole acetic acid methyl ester, etc.

(f) Mercaptoimidazoles—2-mercapto - 4(5) - imidazolecarboxylic acid methyl ester, ethyl ester, etc.

(3) Imidazoline derivatives—2 - methyl-2-imidazoline, 2-phenyl-2-imidazoline, 2-chloromethyl - 2 - imidazoline, 2 - hydroxymethyl-2-imidazoline, 2-nitroamino-2-imidazoline, etc.

(4) Imidazolone derivatives—2 - imidazolone derivatives: 4(5)-methyl-2-imidazolone, 4,5 - dimethyl-2-imidazolone, 2-imidazolone-4-carboxylic acid, etc.; 4(5)-imidazolone derivatives: 2 - methyl-4(5)-imidazolone, 2-benzyl-4(5)-imidazolone, 4(5)-imidazolone - 2 - carboxylic acid, etc.

(5) Imidazolidinone (Imidazolidone) derivatives—2-imidazolidinone (ethylene urea), 2,4-imidazolidinone, imidazolidine-2-thione, etc.

(6) Imidazolidine derivatives—1,3 - dibenzyl-2-phenyl-imidazolidine, etc.

(7) Benzimidazole.

(8) Benzimidazole derivatives—Alkyl- and aryl-benzimidazoles: 1-ethylbenzimidazole, 1-methylbenzimidazole, 2-benzylbenzimidazole, etc.; hydroxy, nitro, and amino-benzimidazoles: 2-hydroxymethylbenzimidazole, 5-nitrobenzimidazole, 2-aminobenzimidazole, etc.; benzimidazolecarboxylic acid derivatives: 2-benzimidazolecarboxylic acid, 5(6)-methyl-2-benzimidazolecarboxylic acid, etc.

Imidazole compounds such as those noted above are generally crystalline. Hence, they are used by dissolving them directly in the polymerization solvent employed for the NCA. Suitable polymerization solvents include, for example, dioxane, ethylacetate, dichloromethane, dichloroethane, dimethylsulfoxide, N-methyl-2-pyrrolidone and N,N-dimethylformamide. Alternatively, the imidazole compounds can be dissolved in a good solvent therefor such as, for example, N,N-dimethylformamide or dimethyl sulfoxide, and the solvent solution of polymerization initiator can then be employed in the polymerization reaction.

The polymerization initiators of the present invention are generally used in an amount of 0.1 mole percent or more with respect to the NCA used in the polymerization. No specific restriction is imposed on the manner in which the polymerization initiator is brought into contact with or is mixed with the NCA. An NCA solution or a solid NCA may be added to a solution containing an initiator, or the initiator itself, or alternatively a solution containing the initiator or the initiator itself, may be added, as noted above, to a solution or suspension of NCA or to solid NCA.

The solvents used for the polymerization reaction per se include organic ethers, esters, ketones, hydrocarbons, halogenated hydrocarbons, N-substituted aliphatic amides and other organic compounds which will not decompose NCA, for example, dioxane, tetrahydrofuran, ethyl acetate, benzene, toluene, nitrobenzene, dichloromethane, dichloroethane, chloroform, N,N-dimethylformamide, dimethylsulfoxide and N-methyl-2-pyrrolidone. These solvents may be used either singly or in mixtures of various combinations thereof.

The temperature to be employed during the polymerization reaction is not limited in particular, but usually it is found advantageous to carry out the polymerization at a temperature range of from about —20° to 120° C.

The following examples are given merely as illustrative of the present invention and are not to be considered as limiting. Unless otherwise noted, the percentages therein are by weight.

EXAMPLE 1

Ten g. of the N-carboxy anhydride of L-glutamic acid-γ-methyl ester is dissolved in 100 cc. of dioxane. Then, 115 mg. of N-ethylimidazole is added thereto at room temperature. The polymerization is accomplished in eight hours in a dry nitrogen atmosphere. Methanol is added to the reaction mixture, and the polymer is obtained as a precipitate.

As a result, 7.6 g. (dry weight) of the polymer is obtained. This is a yield of 99.5%, which is substantially quantitative. The limiting viscosity number (intrinsic viscosity) [$\eta$] of the product polymer is 1.8, when measured at 25° C. using dichloroacetate acid as the solvent. The same procedure of measurement is also employed in the examples described hereinbelow.

EXAMPLE 2

Ten g. of the N-carboxy anhydride of L-glutamic acid-γ-methyl ester is added to 120 cc. of a mixed solvent consisting of dioxane and dichloroethane (1:4 by volume ratio). Then, 48 mg. of 2-methylimidazole dissolved in a small amount of dimethylformamide is added to the reaction mixture.

After eight hours of reaction, a highly viscous, clear polymer solution is obtained. After pouring the reaction solution into methanol, a dry polymer (7.55 g. in weight) is obtained. This is a yield of 99%, which is substantially quantitative. The limiting viscosity number [$\eta$] of the polymer is 1.90, measured as described in Example 1.

EXAMPLE 3

Ten g. of ε-N-carbobenzoxy-L-lysine-α-N-carboxy anhydride is added to 100 cc. of dioxane, to which 40 mg. of imidazole is added. After 12 hours, a highly viscous solution of poly-ε-N-carbobenzoxy-L-lysine is obtained. The solution is poured into methanol, thereby yielding a polymer having the limiting viscosity number [$\eta$] of 1.3.

EXAMPLE 4

Ten g. of L-alanine N-carboxy anhydride is dissolved in 100 cc. of dioxane. Added thereto is 75 mg. of N-ethylimidazole. After 12 hours, methanol is added in an amount five times that of the reaction liquid, thereby precipitating the polymer product. The dry weight of poly-L-alanine obtained is 5.9 g. The yield is 95%, and the viscosity number (reduced viscosity) of the polymer is 4.6, when measured in dichloroacetic acid at a concentration of 1% and a temperature of 25° C.

EXAMPLE 5

Ten g. of L-leucine N-carboxy anhydride is dissolved in 100 cc. of ethyl acetate and, after adding 128 mg. of 2-methylimidazole thereto, the polymerization is carried out for 12 hours at room temperature. Then, the reaction solution is poured into methanol, and the resultant precipitated polymer is separated. The dry weight of the polymer is 6.5 g., representing a yield of 90%. The polymer shows the viscosity number of 3.2.

EXAMPLE 6

Ten g. of γ-methyl-L-glutamic acid N-carboxy anhydride is added to 100 cc. of dichloroethane. 115 mg. of ethylene urea (2-imidazolidinone) dissolved in a small amount of dimethylformamide or dimethyl sulfoxide is added to the reaction solution. After 12 hours, methanol is added, and the precipitated polymer is then separated. The dry weight of the polymer is 7.0 g., representing a yield of 91%, and the limiting viscosity number [$\eta$] thereof, measured in the same manner as described in Example 1, is 2.8.

EXAMPLE 7

Ten g. of γ-methyl-D, L-glutamic acid N-carboxy anhydride is reacted in the same manner as described in Example 1. As a result, a polymer is obtained having a dry weight of 6.5 g., representing a yield of 85%. The limiting number [$\eta$] thereof is 0.8.

The invention being thus described, it will be obvious that the same may be varied in many ways. Such variations are not to be regarded as a departure from the spirit and scope of the invention, and all such modifications

We claim:

1. A process for the polymerization of an α-amino acid-N-carboxy-anhydride which comprises polymerizing an inert solvent solution of said anhydride in the presence of imidazole, an imidazole derivative or a mixture thereof as polymerization initiator to give the corresponding fiber- or film-forming polyamino acid.

2. The process of claim 1, wherein said solvent is an organic solvent selected from the group consisting of organic ethers, esters, ketones, hydrocarbons, halogenated hydrocarbons, N-substituted aliphatic amides and mixtures thereof.

3. The process of claim 1, wherein said imidazole derivative is selected from the group consisting of aryl-, aralkyl-, alkaryl-, alkyl-, halogenoalkyl-, halogen-, hydroxyalkyl-, aminoalkyl-, nitro-, amino-, mercapto-, aldehydo- and keto-substituted derivatives of imidazole, imidazolyl carboxylic acids, imidazolyl carboxylic acid amides, imidazolyl carboxylic acid alkyl esters, imidazolines, imidazolones, imidazolidinones (imidazolidones), benzimidazoles and imidazolidines.

4. The process of claim 1, wherein said polymerization initiator is used in an amount of at least 0.1 mole percent of the said α-amino acid-N-carboxy anhydride.

5. The process of claim 1, wherein the polymerization reaction is carried out at a temperature of about —20° to 120° C.

6. A process for the polymerization of an α-amino acid-N-carboxy anhydride which comprises polymerizing a solution or suspended solution of said anhydride in an inert organic solvent in the presence of imidazole, an imidazole derivative or a mixture thereof as a polymerization initiator at a temperature of about —20° to 120° C., whereby the corresponding fiber- or film-forming polyamino acid is produced.

7. The process of claim 6, wherein said imidazole derivative is selected from the group consisting of aryl-, aralkyl-, alkaryl-, alkyl-, halogenoalkyl-, halogen-, hydroxyalkyl-, aminoalkyl, nitro-, amino-, mercapto-, aldehydo- and keto-substituted derivatives of imidazole, imidazolyl carboxylic acids, imidazolyl carboxylic acid amides, imidazolyl carboxylic acid alkyl esters, imidazolines, imidazolones, imidazolidinones (imidazolidones), benzimidazoles and imidazolidines.

8. The process of claim 6, wherein said polymerization initiator is used in an amount of at least 0.1 mole percent of the said α-amino acid-N-carboxy anhydride.

References Cited

UNITED STATES PATENTS 2,592,447 4/1952 MacDonald.
2,608,548 8/1952 Tullock.
3,350,365 10/1967 Wakasa et al.

WILLIAM H. SHORT, Primary Examiner

E. WOODBERRY, Assistant Examiner

U.S. Cl. X.R.

252—188.3

UNITED STATES PATENT OFFICE
CERTIFICATE OF CORRECTION

Patent No. 3,536,672      Dated October 27, 1970

Inventor(s)  Yasuo Fujimoto and Keizo Tatsukawa

It is certified that error appears in the above-identified patent and that said Letters Patent are hereby corrected as shown below:

In the Heading:

after "Ser. No. 764,987" insert

-- claims priority, application Japan,

July 20, 1967, No. 42/46338 --.

Signed and sealed this 8th day of October 1974.

(SEAL)
Attest:

McCOY M. GIBSON JR.
Attesting Officer

C. MARSHALL DANN
Commissioner of Patents